US012306649B2

(12) United States Patent
Sawigun et al.

(10) Patent No.: US 12,306,649 B2
(45) Date of Patent: May 20, 2025

(54) REFERENCE CIRCUIT AND A POWER MANAGEMENT UNIT

(71) Applicant: IMEC VZW, Leuven (BE)

(72) Inventors: Chutham Sawigun, Leuven (BE); En-Chi Chang, Leuven (BE)

(73) Assignee: IMEC VZW, Leuven (BE)

( * ) Notice: Subject to any disclaimer, the term of this patent is extended or adjusted under 35 U.S.C. 154(b) by 256 days.

(21) Appl. No.: 18/132,664

(22) Filed: Apr. 10, 2023

(65) Prior Publication Data

US 2023/0333580 A1 Oct. 19, 2023

(30) Foreign Application Priority Data

Apr. 14, 2022 (EP) .................................... 22168382

(51) Int. Cl.

*G05F 1/46* (2006.01)
*G05F 1/565* (2006.01)
*G05F 3/26* (2006.01)

(52) U.S. Cl.

CPC .............. *G05F 1/468* (2013.01); *G05F 1/565* (2013.01); *G05F 3/262* (2013.01)

(58) Field of Classification Search

CPC .......... G05F 1/468; G05F 1/565; G05F 3/242; G05F 3/262

See application file for complete search history.

(56) References Cited

U.S. PATENT DOCUMENTS

| | | | | |
|---|---|---|---|---|
| 2007/0075699 | A1 | 4/2007 | Chih | |
| 2010/0148857 | A1* | 6/2010 | Chellappa | G05F 3/242 327/538 |
| 2011/0169570 | A1 | 7/2011 | Aota et al. | |
| 2014/0015509 | A1* | 1/2014 | Gupta | G05F 3/30 323/313 |
| 2014/0118304 | A1* | 5/2014 | Chang | G06F 3/0423 345/175 |
| 2017/0373654 | A1* | 12/2017 | Pasotti | H03F 3/45183 |
| 2019/0299006 | A1 | 10/2019 | Marnfeldt | |

FOREIGN PATENT DOCUMENTS

JP 2008152632 A 7/2008

OTHER PUBLICATIONS

Kim, et al: "A Single BJT Bandgap Reference With Frequency Compensation Exploiting Mirror Pole", IEEE Journal of Solid-State Circuits, vol. 56, No. 10, pp. 2902-2912, 2021.

(Continued)

*Primary Examiner* — Jue Zhang
*Assistant Examiner* — Lakaisha Jackson
(74) *Attorney, Agent, or Firm* — MOSER TABOADA

(57) ABSTRACT

A reference circuit for providing voltage reference and current reference comprises: operational amplifier comprising first transistor, second transistor and current mirror being configured to force a same drain current through first and second transistor, wherein first and second transistor control voltage reference at first node of reference circuit; and reference output comprising reference resistor connected between ground and first node and reference transistor, whereby reference circuit is configured to provide voltage reference at first node and current reference through reference resistor and reference transistor.

15 Claims, 8 Drawing Sheets

(56) References Cited

OTHER PUBLICATIONS

Kim, et al: "A 0.0082-mm$^2$, 192-nW Single BJT Branch Bandgap Reference in 0.18-µm CMOS", IEEE Solid-State Circuits Letters, vol. 3, pp. 426-429, 2020.
Lee, et al: "A 1.4-µW 24.9-ppm/° C. Current Reference With Process-Insensitive Temperature Compensation in 0.18-µm CMOS", IEEE Journal of Solid-State Circuits, vol. 47, No. 10, pp. 2527-2533, 2012.
Seok, et al: "A Portable 2-Transistor Picowatt Temperature-Compensated Voltage Reference Operating at 0.5 V", IEEE Journal of Solid-State Circuits, vol. 47, No. 10, pp. 2534-2545, 2012.
Wang, et al: "A 0.7-V 28-nW CMOS Subthreshold Voltage and Current Reference in One Simple Circuit", IEEE Transactions on Circuits and Systems—I: Regular Papers, vol. 66, No. 9, pp. 3457-3466, 2019.
Ji, et al: "5.8 A 9.3nW All-in-One Bandgap Voltage and Current Reference Circuit", 2017 IEEE International Solid-State Circuits Conference, pp. 100-102, 2017.
Extended European Search Report in EP22168382.4 dated Sep. 13, 2022.

* cited by examiner

REFERENCE CIRCUIT AND A POWER MANAGEMENT UNIT

CROSS-REFERENCE TO RELATED APPLICATIONS

The present application claims the benefit of and priority to EP Patent Application Serial No. 22168382.4, filed Apr. 14, 2022, the entire contents of which is incorporated herein by reference.

TECHNICAL FIELD

The present description relates to a reference circuit, which is configured to provide a voltage reference and a current reference. The present description further relates to a power management unit comprising the reference circuit.

BACKGROUND

Voltage reference circuits and current reference circuits are used for providing a reliable reference voltage and a reliable reference current, respectively. A reference voltage and/or a reference current may further be used to control electronic circuits. For instance, a power management unit typically uses a voltage reference circuit and/or a current reference circuit in order to provide a reliable reference voltage and/or reference current, which can be used to generate direct current (DC) voltages and currents for biasing or supplying to an electronic circuit.

The current reference circuit may be implemented using a voltage reference circuit providing a reference voltage, an operational amplifier providing regulation of the reference voltage and an output part for outputting a reference current. Such a current reference circuit may also be used for outputting a reference voltage.

The reference voltage output by the voltage reference circuit should provide a stable voltage level which is not affected or minimally affected by parameter variations, such as temperature variations or variations in supply voltage to the reference voltage circuit. This may also imply that the reference current output by the current reference circuit receiving the reference voltage from the voltage reference circuit may provide a stable current level when receiving a stable voltage level.

In addition, the voltage reference circuit and/or current reference circuit should be able to consume very small power levels. In particular, the voltage reference circuit and/or current reference circuit may be used in small devices, such as Internet of Things (IoT) devices that may be almost exclusively in a sleep mode and only awake for brief moments of time. Thus, power consumption of such devices is mainly based on the power consumed during sleep mode. The voltage reference circuit and/or current reference circuit may however be always-on and therefore the power consumption of the voltage reference circuit and/or current reference circuit may be of huge importance. However, the use of a voltage reference circuit in combination with the operational amplifier for implementing a current reference circuit may imply that the power consumption of such current reference circuit is relatively large.

SUMMARY

An objective of the present description is to provide a reference circuit for providing a voltage reference and a current reference with a compact area and low power consumption, while providing an insensitivity to parameter variations, such as variations in supply voltage and/or temperature.

This and other objectives are at least partly met by the invention as defined in the independent claims. Preferred embodiments are set out in the dependent claims.

According to a first aspect, there is provided a reference circuit for providing a voltage reference and a current reference, said reference circuit comprising: an operational amplifier comprising a first transistor, a second transistor and a current mirror, wherein the current mirror has unity gain and is configured to force a same drain current through the first transistor and the second transistor, wherein the first transistor and the second transistor control the voltage reference at a first node of the reference circuit; and a reference output comprising a reference resistor connected between ground and the first node and a reference transistor with drain and source terminals connected between a supply voltage and the first node, whereby the reference circuit is configured to provide the voltage reference at the first node and the current reference through the reference resistor and reference transistor.

A voltage reference circuit may be formed by two transistors, which are arranged in a stacked connection so that the drain currents of the two transistors are identical. A difference of gate-source voltages of the two transistors can form a reference voltage.

Thanks to the first aspect, the first transistor and the second transistor within the operational amplifier are arranged with the current mirror such that the same drain current is forced through the first transistor and the second transistor. This implies that the first transistor and the second transistor of the operational amplifier can have a dual functionality in forming part of the operational amplifier and also generating the reference voltage. Hence, according to the first aspect, there is not a need for a voltage reference circuit that provides a reference voltage to the operational amplifier. Rather, the reference voltage may be generated within the operational amplifier, which is further used for generating the reference current.

The reference circuit may therefore be implemented with a compact circuit for providing both a reference current and a reference voltage. This also implies that the reference circuit may have a very small power consumption.

The first transistor and the second transistor may be connected to receive input signals of the operational amplifier on respective gate terminals. Thus, a first input signal to the operational amplifier may be received on a gate terminal of the first transistor. Further, a second input signal to the operational amplifier may be received on a gate terminal of the second transistor.

An output from the operational amplifier may be received at a gate terminal of the reference transistor. The reference transistor may thus have a voltage at the gate terminal based on the output from the operational amplifier and a source terminal connected to the first node. The gate-to-source voltage of the reference transistor may be constant as the constant current reference is conducted by the reference transistor.

As used herein, the term “connected” should be construed as comprising directly connected, such that no components are arranged between the terminals/devices that are connected, unless specifically described otherwise.

According to an embodiment, the first transistor and the second transistor are p-type metal-oxide-semiconductor (pMOS) transistors.

pMOS transistors may suffer less from a body effect compared to n-type metal-oxide semiconductor (nMOS). This implies that using pMOS transistors, the drain current through the first transistor and the second transistor may be more stable e.g., in relation to temperature variations, compared to if nMOS transistors would be used. This implies that the reference circuit is insensitive to such temperature variations.

According to an embodiment, a threshold voltage of the first transistor is lower than a threshold voltage of the second transistor.

The reference voltage is dependent on a difference in threshold voltages of the first transistor and the second transistor. Thus, the threshold voltage of the first transistor being smaller than the threshold voltage of the second transistor is utilized in generating the reference voltage by the reference circuit.

The first transistor and the second transistor may be input/output transistors.

An integrated circuit may comprise input/output transistors and core transistors. Core transistors may have a relatively thin gate oxide layer and are typically used for high speed operations which may be used internally in the integrated circuit. In comparison to core transistors, input/output transistors may have a relatively thick gate oxide layer and are typically used for communication with external devices and, hence, the transistors may be referred to as input/output transistors. Thus, the first transistor and the second transistor being input/output transistors should be construed as the transistors being a particular type of transistor within an integrated circuit rather than the transistors necessarily being arranged to communicate with any external device.

The input/output transistors have a low gate leakage current. This implies that the gate leakage current may be negligible compared to drain current of the transistors. The first transistor and the second transistor are further connected such that an equal drain current is provided through the first and second transistors. This implies that the current through the transistors may be accurately controlled for ensuring that a stable reference voltage is maintained at the first node.

The first transistor may thus be an input/output transistor having a lower threshold voltage than the second transistor also being an input/output transistor.

Alternatively, the first transistor may be a native transistor, providing a low threshold voltage and ensuring that the first transistor has a lower threshold voltage than the second transistor.

A native transistor can be formed without specially grown oxide, using only a natural thin oxide film that may be formed over silicon during processing of other layers when manufacturing transistors. However, a native transistor may be noisy, such that the first transistor may preferably be an input/output transistor.

According to an embodiment, a source terminal of the first transistor and a source terminal of the second transistor are connected to a common node and wherein a drain terminal of the first transistor is connected to a first branch of the current mirror and a drain terminal of the second transistor is connected to a second branch of the current mirror, wherein a gate terminal of the first transistor is connected to the first node for providing the voltage reference.

The first transistor and the second transistor may be pMOS transistors and configured to conduct a current from source to drain operating in a subthreshold region.

The first transistor and the second transistor may be configured such that a drain current of the first transistor flows in the first branch and a drain current of the second transistor flows in the second branch. Thanks to the current mirror, the same drain current can then be forced through the first transistor and the second transistor.

The gate terminal of the first transistor may be connected to the first node such that the reference voltage is fed back and provided as input to the operational amplifier. This facilitates that a stable reference voltage is provided.

According to an embodiment, the operational amplifier further comprises a current source providing a tail current of the operational amplifier, wherein the current source is connected to the common node.

The current source may provide a current which is insensitive to voltage variations. Thus, the current source may facilitate that a stable reference voltage is provided.

Further, the current source provides the tail current which may split a difference between inputs to the operational amplifier such that the different is split between two sides of the operational amplifier.

According to an embodiment, the current source comprises a current source transistor, wherein a gate terminal of the current source transistor is connected to a gate terminal of the reference transistor for copying the current reference and providing the current reference as basis for the tail current.

This is a simple manner of forming the current source. The current source may thus simply copy a current, which is anyway provided in the reference circuit. The current source may directly copy the current reference but may alternatively provide a fraction of the current reference, such that the tail current is a pre-determined fraction of the current reference.

According to an embodiment, the reference circuit further comprises an additional current branch comprising a current buffer transistor, wherein drain and source terminals of the current buffer transistor are connected between an output of the operational amplifier and a gate terminal of the reference transistor.

The output of the operational amplifier may be provided at the drain terminal of the second transistor. The output may further be connected to the gate terminal of the reference transistor. The gate terminal may have a constant voltage as the reference transistor conducts a constant current reference and hence the gate-to-source voltage of the reference transistor is constant.

However, if there is a variation in supply voltage, the gate voltage of the reference transistor and hence a drain voltage of the second transistor may follow. This may imply that the second transistor can be brought out of operation in saturation at subthreshold region. This will affect the reference voltage such that the reference circuit would no longer maintain a stable reference voltage and reference current.

Thanks to using the current buffer transistor, the gate terminal of the reference transistor is no longer directly connected to the drain terminal of the second transistor. Hence, the output of the operational amplifier may be isolated from the gate terminal of the reference transistor. This implies that the drain voltage of the second transistor may not be affected by changes in supply voltage so that the second transistor may be maintained in operation in saturation at subthreshold region.

According to an embodiment, the reference circuit further comprises a compensation capacitor between the output of the operational amplifier and the first node.

The compensation capacitor provides a pole splitting effect to widen a distance between poles. This implies that phase margin of the reference circuit may be controlled to be positive, such as >45°.

The compensation capacitor may thus ensure stability of the reference circuit.

According to an embodiment, the reference circuit further comprises a bias transistor having a gate terminal connected to the current mirror for copying a current of the current mirror, wherein the bias transistor is further connected to the current buffer transistor for providing a bias current for the current buffer transistor.

Thus, the bias transistor may provide a bias current for the current buffer transistor. The bias transistor may be connected to the current mirror for copying the current of the current mirror. This is a simple manner for providing the bias current to the current buffer transistor.

According to an embodiment, the operational amplifier is configured to output a voltage signal to a gate terminal of the reference transistor.

Thus, the output of the operational amplifier may be provided to the gate terminal of the reference transistor. However, as mentioned above, in some embodiments, the current buffer transistor may be arranged between the output of the operational amplifier and the gate terminal of the reference transistor such that the operational amplifier may output the voltage signal via the current buffer transistor.

According to an embodiment, the reference resistor comprises a first reference resistor and a second reference resistor connected in series, wherein the first reference resistor has a resistance proportional to absolute temperature (PTAT) and the second reference resistor has a resistance complementary to absolute temperature (CTAT).

Most resistors are dependent on temperature. Thanks to the reference resistor comprising a first reference resistor being PTAT and a second reference resistor being CTAT, the reference resistor may overall provide a resistance which is temperature independent or has a low sensitivity to temperature variations.

The first reference resistor and the second reference resistor may be connected in series.

According to an embodiment, the reference circuit further comprises a start-up circuit connected to the reference output for maintaining a non-zero current reference.

The start-up circuit may act to bring the reference circuit from a zero current operating point to a normal operating point (providing a desired current reference). The start-up circuit may thus ensure proper function of the reference circuit when the reference circuit is initiated.

The start-up circuit may be configured to turn off once the reference circuit has reached normal operation. Thus, the start-up circuit need not consume power once it is no longer needed.

According to an embodiment, the operational amplifier is a single-stage operational amplifier.

This implies that the operational amplifier is simple and may be configured in a compact manner such that the reference circuit may be power efficient and area efficient.

According to a second aspect, there is provided a power management unit comprising the reference circuit according to the first aspect, the power management unit being configured to produce a direct current, DC, voltage based on the reference voltage and/or a DC current based on the current reference.

Effects and features of this second aspect are largely analogous to those described above in connection with the first aspect. Embodiments mentioned in relation to the second aspect are largely compatible with the first aspect.

Power management units typically provide DC voltages and currents for supplying to an electronic circuit. Thanks to the reference circuit providing a stable reference voltage and a stable current reference, the power management unit may also provide reliable supply voltages and currents to electronic circuits connected to the power management unit.

Further, the reference circuit may provide a low power consumption and a compact architecture such that the power management unit may also be compact and provided with low power consumption.

The solutions described in the present description can be applied in numerous electronic circuitry devices and applications.

According to a third aspect, a neural sensing apparatus comprising the power management unit according to the second aspect.

Effects and features of this third aspect are largely analogous to those described above in connection with the first and second aspects. Embodiments mentioned in relation to the third aspect are largely compatible with the first and second aspects.

For a neural sensing apparatus, such as a neural probe, it is particularly advantageous if the apparatus is small, stable and/or power efficient. Thus, the power management unit utilizing the reference circuit may be particularly advantageous to use in the neural sensing apparatus.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
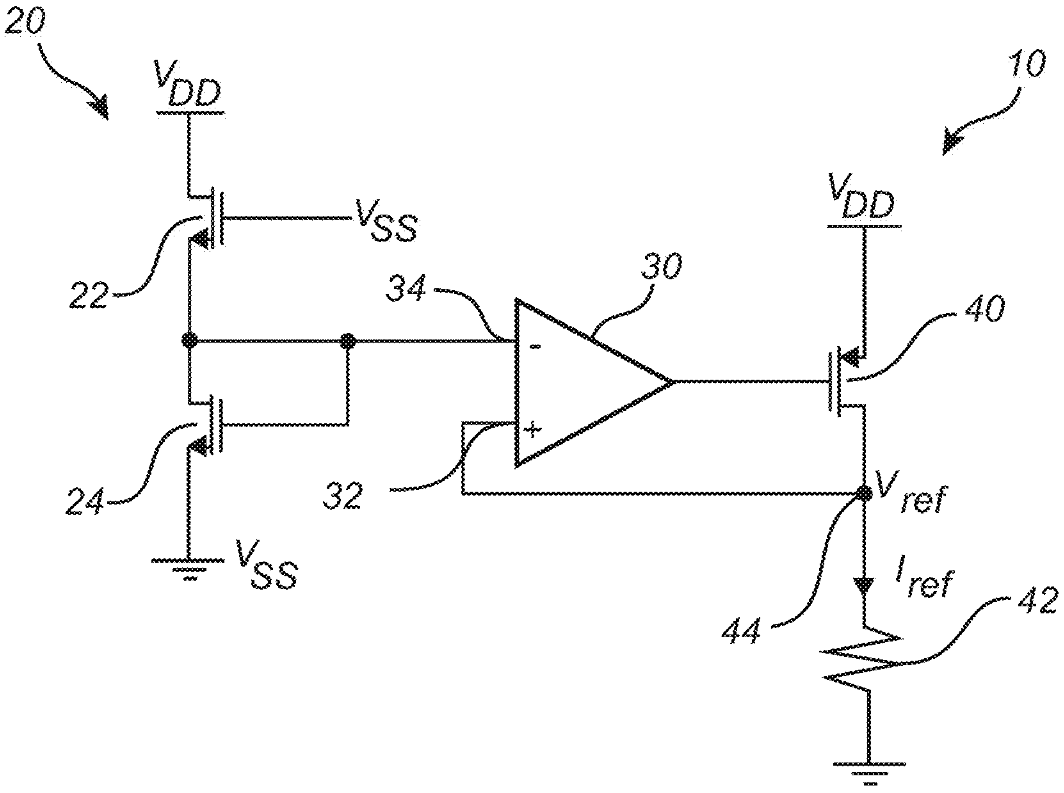
FIG. 1 is a schematic view of a reference circuit providing an introduction to the invention.

FIG. 1 illustrates a reference circuit 10, which is configured to provide a voltage reference and a current reference. The reference circuit 10 of FIG. 1 is discussed merely as an introduction to the invention.

The reference circuit 10 comprises a voltage source 20. The voltage source 20 comprises a first transistor 22 and a second transistor 24 arranged in a common branch. The first and second transistors 22, 24 are configured to operate in saturation at subthreshold region and the first and second transistors 22, 24 thus flow the same current. The first and second transistors 22, 24 have different threshold voltages.

Drain current $I_{D1}$ of the first transistor 22 and drain current $I_{D2}$ of the second transistor 24 operating in the subthreshold region may be defined as:

$$I_{D1} = \mu_1 C_{ox1} \frac{W_1}{L_1} V_T^2 \exp\left(\frac{0 - V_{th1} - V_{ref}}{V_T}\right), \quad (1)$$

$$I_{D2} = \mu_2 C_{ox2} \frac{W_2}{L_2} V_T^2 \exp\left(\frac{V_{ref} - 0 - V_{th2}}{V_T}\right), \quad (2)$$

where $\mu_1$, $\mu_2$ are carrier mobilities of the first and second transistors, respectively, $C_{ox1}$, $C_{ox2}$ are oxide capacitance of the first and second transistors, respectively, $W_1$, $W_2$ are channel widths of the first and second transistors, respectively, $L_1$, $L_2$ are channel lengths of the first and second transistors, respectively, $V_T$ is a thermal voltage, $V_{th1}$, $V_{th2}$ are threshold voltages of the first and the second transistors, respectively, and $V_{ref}$ is the voltage reference provided at a node between the first and the second transistors.

Since the drain current $I_{D1}$ of the first transistor 22 and drain current $I_{D2}$ of the second transistor 24 are equal, the voltage reference $V_{ref}$ may be solved from equating equations (1) and (2):

$$V_{ref} = \frac{1}{2}\Delta V_{th} + V_T \ln\left(\frac{W_1 L_2}{W_2 L_1}\right), \quad (3)$$

where $\Delta V_{th}$ is a difference between the threshold voltage of the first transistor 22 and the threshold voltage of the second transistor 24.

It can be seen that the voltage reference is naturally independent of the supply voltage. Also, by properly sizing the first and the second transistors 22, 24, sensitivity of voltage reference to variations in temperature may be improved.

The reference circuit 10 may further comprise an operational amplifier for allowing the voltage reference from the voltage source 20 to be converted to a current reference. The operational amplifier 30 is configured to provide an output to a gate terminal of a reference transistor 40, which is further connected with a drain terminal and a source terminal arranged between supply voltage and a reference resistor 42. The operational amplifier is configured to receive feedback from a first node 44 between the reference transistor 40 and the reference resistor 42 on a non-inverting input 32 of the operational amplifier 30 and to receive the voltage reference from the voltage source 20 on an inverting input 34 of the operational amplifier 30. This implies that the output of the operational amplifier 30 will be stable and constant.

The reference resistor 42 is arranged between ground and the first node 44. A large loop gain of the operational amplifier 30 will force voltage across the reference resistor 42 to correspond to the voltage reference $V_{ref}$. This further implies that a current reference $I_{ref}=V_{ref}/R$, where R is resistance of the reference resistor 42, will flow through the reference resistor 42 and hence also through the reference transistor 40. The reference current can then be copied by current mirroring via the reference transistor 40 in order to allow the current reference to be provided by the reference circuit 10.

However, as can be seen in FIG. 1, the reference circuit 10 comprises three stages, namely a first stage for generating a voltage reference, a second stage including an operational amplifier for regulating the generated voltage reference, and a third stage for outputting the voltage reference and the current reference.

According to the present description, it is realized that the first and second stage may be combined in order to provide a compact reference circuit providing a low power consumption and requiring a small area for implementing the reference circuit.

Figure 2:
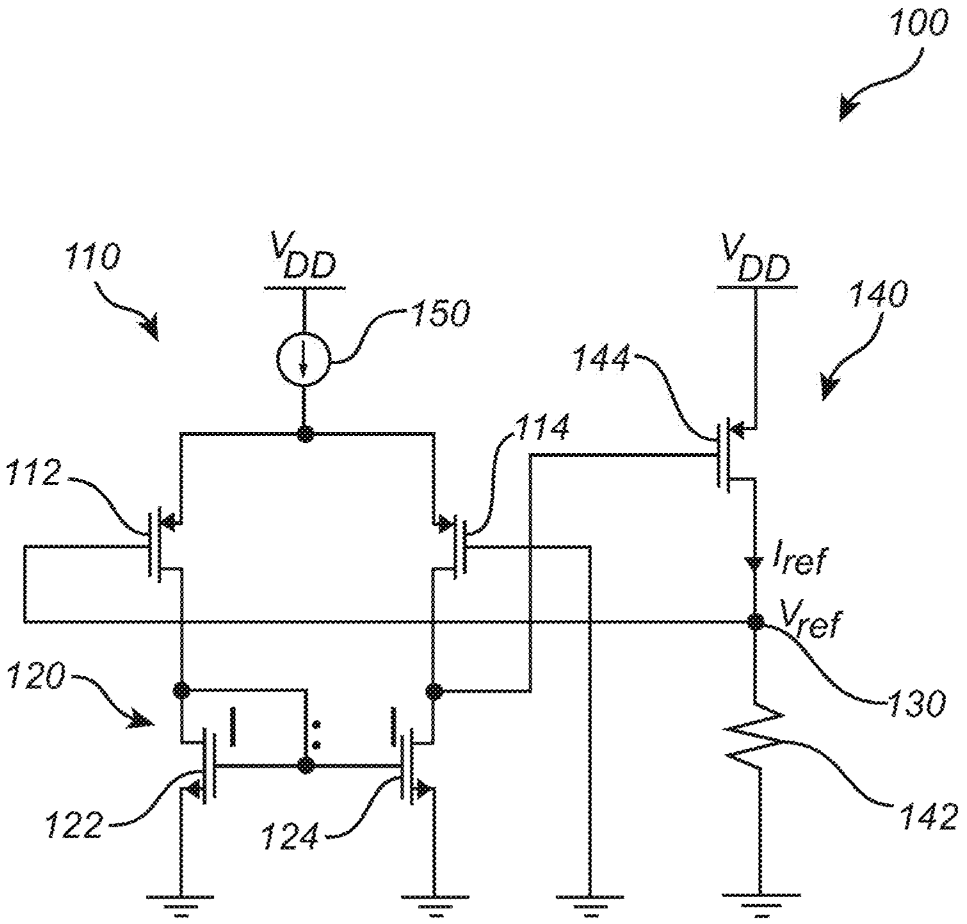
FIG. 2 is a schematic view of a reference circuit according to a first embodiment.

Referring now to FIG. 2, a reference circuit 100 according to a first embodiment will be described.

The reference circuit 100 comprises an operational amplifier 110 wherein a first transistor 112 and a second transistor 114 are included in the operational amplifier 110 for forming a voltage reference. Thus, instead of having the first and second transistors in a separate first stage, as illustrated in FIG. 1, the reference circuit 100 is configured to generate the reference voltage within the operational amplifier 110 in a manner similar to the voltage source 20 described above in relation to FIG. 1.

As discussed above for the voltage source 20, the first transistor 22 and the second transistor 24 conduct an equal drain current. However, as illustrated in FIG. 2, the first transistor 112 and the second transistor 114 are arranged in separate branches, since the first transistor 112 and the second transistor 114 form part of the operational amplifier 110.

The operational amplifier 110 therefore comprises a current mirror 120. The current mirror 120 has unity gain and is configured to copy a current in a first branch to a second branch. The first transistor 112 is arranged in the first branch with a drain current flowing through the first transistor 112. The current mirror 120 will thanks to the unity gain copy the drain current flowing through the first transistor 112 and force the same current to flow through the second branch. The second transistor 114 is arranged in the second branch such that a drain current flowing through the second transistor 114 will correspond to the current flowing through the second branch. Hence, thanks to the operational amplifier 110 comprising the current mirror 120, the same drain current may flow through the first transistor 112 and the second transistor 114.

According to an embodiment, the current mirror 120 comprises a first current mirror transistor 122 and a second current mirror transistor 124. The first current mirror transistor 122 and the second current mirror transistor 124 may be nMOS transistors. The first current mirror transistor 122 and the second current mirror transistor 124 may further be identical in order to ensure that the current mirror 120 has unity gain.

The first current mirror transistor 122 has a source terminal connected to ground. The first current mirror transistor 122 further has a drain terminal connected to the first transistor 112 in a first branch of the operational amplifier 110 such that a current flowing through the first transistor 112 will also flow through the first current mirror transistor 122. The first current mirror transistor 122 further has a gate terminal connected to the drain terminal.

The second current mirror transistor 124 also has a source terminal connected to ground. The second current mirror transistor 124 further has a drain terminal connected to the second transistor 114 in a second branch of the operational amplifier 110 such that a current flowing through the second transistor 114 will also flow through the second current mirror transistor 124. Further, a gate terminal of the second current mirror transistor 124 is connected to the gate terminal of the first current mirror transistor 122 such that gate-to-source voltage of the first current mirror transistor 122 and the second current mirror transistor 124 is equal and that the drain current of the first current mirror transistor 122 and the second current mirror transistor 124 will be equal.

The first transistor 112 and the second transistor 114 may be pMOS transistors. The threshold voltage of the first transistor 112 may be lower than a threshold voltage of the second transistor 114. For instance, the first transistor 112 may have a thicker gate oxide layer than the second transistor 114.

The first transistor 112 and the second transistor 114 may each have a source terminal connected to a common node. The drain terminal of the first transistor 112 may be connected to the first branch of the current mirror 120 being connected to the drain terminal of the first current mirror transistor 122. Also, the drain terminal of the second transistor 114 may be connected to the second branch of the current mirror 120 being connected to the drain terminal of the second current mirror transistor 124.

The first transistor 112 and the second transistor 114 may further form input transistors of the operational amplifier 110 such that input signals to the operational amplifier 110 are received on gate terminals of the first transistor 112 and the second transistor 114, respectively.

The second transistor 114 may have a gate terminal connected to ground. The first transistor 112 may have a gate terminal connected to a first node 130 such that feedback is provided to the operational amplifier 110 at the gate terminal of the first transistor 112.

A voltage reference $V_{ref}$ at the first node 130 may be derived from Kirchhoff's voltage law as:

$$V_{ref}=V_{sg2}-V_{sg1}, \qquad (4)$$

where $V_{sg1}$ is source-to-gate voltage of the first transistor 112 and $V_{sg2}$ is source-to-gate voltage of the second transistor 114. Further, drain current $I_{D1}$ of the first transistor 112 and drain current $I_{D2}$ of the second transistor 114 operating in the subthreshold region may be defined as:

$$I_{D1} = \mu_1 C_{ox1} \frac{W_1}{L_1} V_T^2 \exp\left(\frac{V_{sg1} - V_{th1}}{V_T}\right), \qquad (5)$$

$$I_{D2} = \mu_2 C_{ox2} \frac{W_2}{L_2} V_T^2 \exp\left(\frac{V_{sg2} - V_{th2}}{V_T}\right). \qquad (6)$$

Since the drain current $I_{D1}$ of the first transistor 112 and drain current $I_{D2}$ of the second transistor 114 are equal, the voltage reference $V_{ref}$ may be expressed based on equations (4)-(6) as:

$$V_{ref} = V_{sg2} - V_{sg1} = \Delta V_{th} + V_T \ln\left(\frac{W_1 L_2}{W_2 L_1}\right). \qquad (7)$$

It can be seen that equation (7) is similar to equation (3) defining the reference voltage provided by the voltage source 20 of the reference circuit 10. Thus, it may be concluded that the reference circuit 100 provides a voltage reference in a similar manner as by the voltage source 20 and that the voltage reference may be generated within the operational amplifier 110. Thus, the first transistor 112 and the second transistor 114 are configured to control the voltage reference at the first node 130.

Hence, a voltage reference based on a difference in threshold voltages of the first transistor 112 and the second transistor 114 may be provided within the operational amplifier 110 such that the reference circuit 100 is very compact. In particular, the operational amplifier 110 may be a single-stage operational amplifier 110.

The first term of equation (7) has a behavior complementary to absolute temperature (CTAT). The second term of equation (7) has a behavior proportional to absolute temperature (PTAT). Characteristics of the first transistor 112 and the second transistor 114, such as sizing of the first transistor 112 and the second transistor 114, may thus be used for providing a voltage reference which is insensitive to temperature variations.

The reference circuit 100 further comprises a reference output 140. The reference output 140 comprises a reference resistor 142 connected between ground and the first node 130. Thus, the voltage across the reference resistor 142 corresponds to the voltage reference $V_{ref}$. This further implies that a current reference $I_{ref}=V_{ref}/R$, where R is resistance of the reference resistor 142, will flow through the reference resistor 142.

The reference output 140 further comprises a reference transistor 144. The reference transistor 144 is arranged with a drain terminal and a source terminal connected between a supply voltage and the first node 130 (and hence further connected to the reference resistor 142). The reference transistor 144 is thus connected to the reference resistor 142 such that a drain current corresponding to the current reference flows through the reference transistor 144, which may be operating in the subthreshold region.

Since the reference transistor 144 is configured such that the current reference flows through the reference resistor 142 and the reference transistor 144, the reference circuit 100 provides a current reference which may be output based on copying the current through the reference transistor 144 through a current mirror.

The reference circuit 100 further provides a voltage reference on the first node 130 and the voltage reference may be output at the first node 130.

The reference transistor 144 may be a pMOS transistor. The reference transistor 144 may thus be arranged with the source terminal connected to supply voltage and the drain terminal connected to the first node 130.

The reference transistor 144 may further be connected to receive a voltage signal from output of the operational amplifier 110 on a gate terminal of the reference transistor 144. As illustrated in FIG. 2, the gate terminal of the reference transistor 144 may thus be connected to the drain terminal of the second transistor 114 providing the output of the operational amplifier 110.

The operational amplifier 110 may further comprise a current source 150. The current source 150 may be connected between supply voltage and the common node to which the source terminals of the first transistor 112 and the second transistor 114 are connected. The current source 150 may be configured to provide a tail current of the operational amplifier 110.

Figure 3:
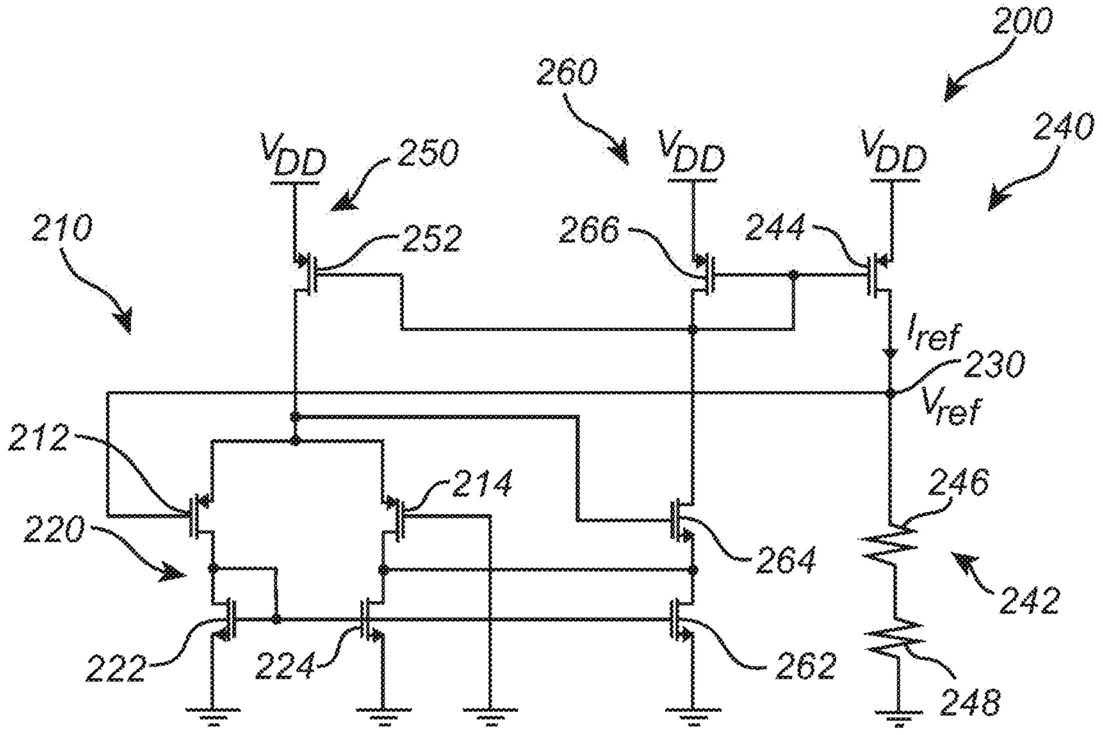
FIG. 3 is a schematic view of a reference circuit according to a second embodiment.

Referring now to FIG. 3, a reference circuit 200 according to a second embodiment will be described. The reference circuit 200 corresponds to the reference circuit 100 and comprises an operational amplifier 210 comprising a first transistor 212, a second transistor 214, a current mirror 220, and a current source 250 as described above for the reference circuit 100. The current mirror 220 further comprises a first current mirror transistor 222 and a second current mirror transistor 224 as described above for the reference circuit 100. The reference circuit 200 further comprises a reference output 240 comprising a first node 230, a reference transistor 244, and a reference resistor 242.

In the reference circuit 100, the gate terminal of the reference transistor 144 is directly connected to the drain terminal of the second transistor 114. However, since the reference transistor 144 is configured to conduct a constant current reference, a source-to-gate voltage of the reference transistor 144 is also constant. Thus, if the supply voltage, to which the source terminal of the reference transistor 144 is connected, is changed, a gate voltage of the reference transistor 144 will also change. This implies that voltage at the drain terminal of the second transistor 144 will also change. This may imply that the second transistor 114 may be brought out of operating at a subthreshold region, which would imply that equation (7) describing the voltage reference would no longer be valid and that a constant voltage reference would no longer be provided.

Thus, the reference circuit 200 is configured to allow the reference circuit 200 to operate over a broader range of variation of the supply voltage while providing a constant voltage reference and a constant current reference.

The reference circuit 200 comprises an additional branch arranged between the supply voltage and ground forming a buffer 260. The buffer 260 is introduced such that the gate terminal of the reference transistor 244 is no longer directly connected to the drain terminal of the second transistor 214.

The buffer 260 comprises a buffer transistor 264 forming a current buffer which isolates output of the operational amplifier 210 from the gate terminal of the reference transistor 244. The buffer transistor 264 may be a nMOS transistor with a drain terminal connected to the gate terminal of the reference transistor 244 and a source terminal connected to the drain terminal of the second transistor 214. The buffer transistor 264 may further have a gate terminal connected to the common node to which the source terminals of the first transistor 112 and the second transistor 114 are connected.

The drain terminal of the second transistor 214 may then be regulated by a potential at the source terminal of the buffer transistor 264 which implies that an almost constant voltage may be expected at the drain terminal of the second transistor 214.

The gate terminal of the reference transistor 244 is thus now connected to the drain terminal of the buffer transistor 264. The drain terminal of the buffer transistor 264 may follow changes of the supply voltage without an operating point of the second transistor 214 being affected. Thus, thanks to the use of the buffer transistor 264, the reference circuit 200 may provide a constant voltage reference and a constant current reference over a large range of variation of the supply voltage.

The buffer 260 may further comprise a bias transistor 262, which is configured to provide a bias current for the buffer transistor 264. The bias transistor 262 may be a nMOS transistor with a drain terminal connected to the source terminal of the buffer transistor 264 and a source terminal connected to ground. The bias transistor 262 may further have a gate terminal connected to a gate terminal of the first current mirror transistor 222 for copying a current from the current mirror 220. The bias transistor 262 may further be identical to the first current mirror transistor 222 such that the drain current of the bias transistor 262 and the buffer transistor 264 may be equal to the drain current through the first transistor 212 and the second transistor 214.

The buffer 260 may further comprise a mirror transistor 266, which is configured in a current mirror relation to the reference transistor 244. Thus, the mirror transistor 266 may further be appropriately dimensioned in relation to the reference transistor 244 such that the current through the additional branch of the buffer 260 relates appropriately to the current reference flowing through the reference transistor 244.

The mirror transistor 266 may be a pMOS transistor with a drain terminal connected to the drain terminal of the buffer transistor 264 and a source terminal connected to the supply voltage. Further, the mirror transistor 266 may have a gate terminal connected to the drain terminal of the mirror transistor 266 and further connected to the gate terminal of the reference transistor 244 for providing mirroring of the current reference so that the current in the additional branch of the buffer 260 is related to the current reference flowing through the reference transistor 244.

The current source 250 may also be implemented by a current mirror. The current source 250 may thus comprise a current source transistor 252. The current source transistor 252 may be a pMOS transistor with a source terminal connected to supply voltage and a drain terminal connected to the common node to which the source terminals of the first transistor 212 and the second transistor 214 are connected. Further, the current source transistor 252 may have a gate terminal connected to the gate terminal of the reference transistor 244 for providing mirroring of the current reference so that the current provided by the current source 250 is related to the current reference flowing through the reference transistor 244.

The reference transistor 244, the mirror transistor 266 and the current source transistor 252 may be dimensioned so as to control a ratio of the currents flowing through each branch of the reference circuit 200. According to an embodiment, a ratio may be set to 2:1:20 with a smallest current flowing through the additional branch of the buffer 260, a medium current flowing through the current source 250 and a highest current flowing through the reference output 240.

For instance, if a current reference of 200 nA is desired, a total current consumption of the reference circuit would be 200 nA*2/20+200 nA*1/20+200 nA=230 nA such that a small current consumption is provided.

As shown in FIG. 3, the reference resistor 242 may comprise a first reference resistor 246 and a second reference resistor 248. The first reference resistor 246 and the second reference resistor 248 may be connected in series in order to together form a combined resistance.

Most resistors have a resistance which is sensitive to temperature. The first reference resistor 246 may have a resistance with PTAT behavior and the second reference resistor 248 may have a resistance with CTAT behavior. This implies that, in combination, temperature coefficients of the first reference resistor 246 and the second reference resistor 248 may compensate each other, such that a combined resistance of the reference resistor 242 may be insensitive to temperature variations. The first reference resistor 246 and the second reference resistor 248 may be dimensioned (width/length of the resistors) such that temperature coefficients may be compensated to a high degree.

Although the reference circuit 200 shown in FIG. 3 includes a buffer 260, a current source 250 being implemented as a current mirror and a reference resistor 242 comprising a first reference resistor 246 and a second reference resistor 248, it should be realized that these features are not tied to each other and may be used in any combination or individually in a reference circuit. Thus, the buffer 260 need not necessarily be used in combination with the current source 250 being implemented as a current mirror, or vice versa. Similarly, the buffer 260 need not necessarily be used in combination with the reference resistor 242 comprising a first reference resistor 246 and a second reference resistor 248, or vice versa. Also, the current source 250 being implemented as a current mirror need not necessarily be used in combination with the reference resistor 242 comprising a first reference resistor 246 and a second reference resistor 248, or vice versa.

Figure 4:
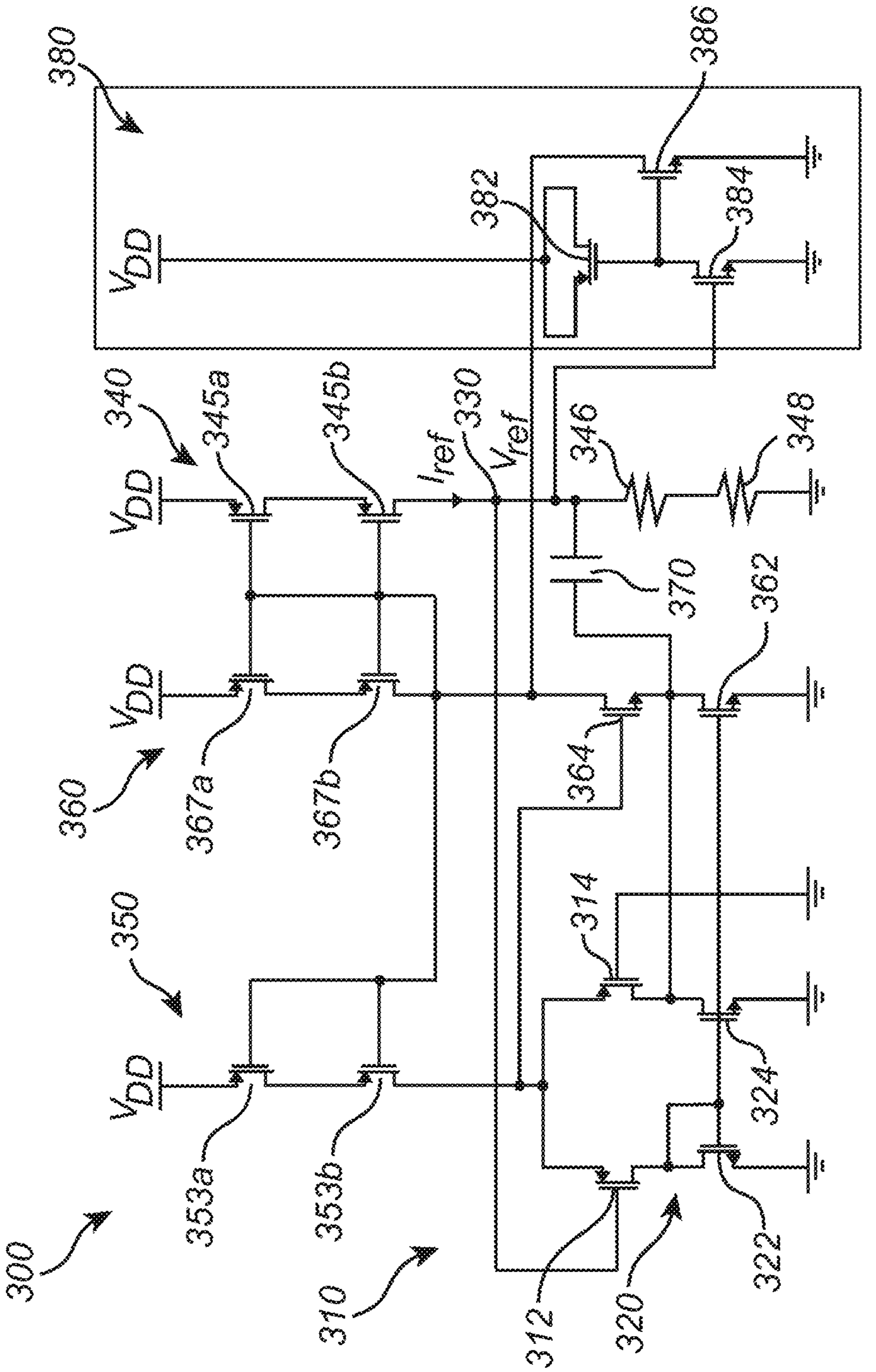
FIG. 4 is a schematic view of a reference circuit according to a third embodiment.

Referring now to FIG. 4, a reference circuit 300 according to a second embodiment will be described. The reference circuit 300 corresponds to the reference circuit 200 and comprises an operational amplifier 310 comprising a first transistor 312, a second transistor 314, a current mirror 320, and a current source 350 as described above for the reference circuit 100. The current mirror 320 further comprises a first current mirror transistor 322 and a second current mirror transistor 324 as described above for the reference circuit 100. The reference circuit 300 further comprises a reference output 340 comprising a first node 330, a reference transistor, and a reference resistor, comprising a first reference resistor 346 and a second reference resistor 348 as described above for the reference circuit 200. The reference circuit further comprises a buffer 360 with a buffer transistor 364 and a bias transistor 362 as described above for the reference circuit 200.

The reference circuit 300 makes use of self-cascode transistors. A self-cascode transistor comprises a first transistor and a second transistor connected to each other in a branch such that a drain terminal of the first transistor is connected to a source terminal of the second transistor. Further, gate terminals of the first transistor and the second transistor are connected to each other. The self-cascode circuit may be configured to operate with the first transistor in linear or saturation region and with the second transistor in linear region. This implies that a low voltage input is required such that a small voltage room of the reference circuit 300 is sacrificed.

In the reference circuit 300, a self-cascode circuit is provided for the reference transistor, the self-cascode circuit comprising a first reference transistor 345*a* and a second reference transistor 345*b*. The first reference transistor 345*a* and the second reference transistor 345*b* may be pMOS transistors with drain and source terminal connected between supply voltage and the first node 330. A source terminal of the first reference transistor 345*a* is connected to supply voltage and a drain terminal of the first reference transistor 345*a* is connected to the first node 330 via the second reference transistor 345*b*, the drain terminal of the first reference transistor 345*a* being connected to a source terminal of the second reference transistor 345*b* and a drain terminal of the second reference transistor 345*b* being connected to the first node 330. The gate terminals of the first reference transistor 345*a* and the second reference transistor 345*b* are further connected to each other and connected to output of the operational amplifier 310 via the buffer transistor 364.

Further, a self-cascode circuit is provided for the mirror transistor of the buffer 360, the self-cascode circuit comprising a first mirror transistor 367*a* and a second mirror transistor 367*b*. The first mirror transistor 367*a* and the second mirror transistor 367*b* may be pMOS transistors, with a source terminal of the first mirror transistor 367*a* being connected to supply voltage, a drain terminal of the first mirror transistor 367*a* being connected to a source terminal of the second mirror transistor 367*b* and a drain terminal of the second mirror transistor 367*b* being connected to the drain terminal of the buffer transistor 364. The gate terminals of the first mirror transistor 367*a* and the second mirror transistor 367*b* are further connected to each other and connected to the gate terminals of the first reference transistor 345*a* and the second reference transistor 345*b* for providing mirroring of the current reference.

Further, a self-cascode circuit is provided for the current source 350, the self-cascode circuit comprising a first current source transistor 353*a* and a second current source transistor 353*b*. The first current source transistor 353*a* and the second current source transistor 353*b* may be pMOS transistors, with a source terminal of the first current source transistor 353*a* being connected to supply voltage, a drain terminal of the first current source transistor 353*a* being connected to a source terminal of the second current source transistor 353*b* and a drain terminal of the second current source transistor 353*b* being connected to the common node to which the source terminals of the first transistor 312 and the second transistor 314 are connected. The gate terminals of the first current source transistor 353*a* and the second current source transistor 353*b* are further connected to each other and connected to the gate terminals of the first reference transistor 345*a* and the second reference transistor 345*b* for providing mirroring of the current reference.

The self-cascode circuits may be used for improving power supply rejection ratio with small voltage room being sacrificed by the self-cascode circuits.

The reference circuit 300 further comprises a compensation capacitor 370. The compensation capacitor 370 is arranged between the output of the operational amplifier 310 and the first node 330.

The compensation capacitor 370 may ensure stability of the reference circuit 300. The compensation capacitor 370 may provide a pole splitting effect to widen a distance between poles of the reference circuit 300. This implies that phase margin of the reference circuit 300 may be controlled to be positive, such as >45°.

The reference circuit 300 further comprises a start-up circuit 380. The start-up circuit 380 may prevent the reference circuit 300 from operating at a zero current reference.

The start-up circuit 380 may act to bring the reference circuit 300 from a zero current operating point to a normal operating point (providing a desired current reference). The start-up circuit 380 may thus ensure proper function of the reference circuit 300 when the reference circuit 300 is turned on.

As shown in FIG. 4, the start-up circuit 380 may comprise a first start-up transistor 382, a second start-up transistor 384 and a third start-up transistor 386. The first start-up transistor 382 is a pMOS transistor having a drain terminal and a source terminal which are shorted, and both connected to supply voltage. The second start-up transistor 384 is a nMOS transistor having a source terminal connected to ground and a drain terminal connected to a gate terminal of the first start-up transistor 382. Further, the second start-up transistor 384 has a gate terminal connected to the first node 330. The third start-up transistor 386 is a nMOS transistor having a source terminal connected to ground and a drain terminal connected to the gate terminals of the first reference transistor 345*a* and the second reference transistor 345*b* and also to the gate terminals of the first mirror transistor 367*a* and the second mirror transistor 367*b* and to the gate terminals of the first current source transistor 353*a* and the second current source transistor 353*b*. Further, the third start-up transistor 386 has a gate terminal connected to the drain terminal of the second start-up transistor 384.

When power of the reference circuit 300 is turned on, the first start-up capacitor 382 functioning as a capacitor causes a gate-to-source voltage of the third start-up capacitor 386 to increase. When the gate-to-source voltage of the third start-up capacitor 386 is larger than a threshold voltage of the third start-up capacitor 386, the third start-up capacitor 386 starts to conduct a current. This implies that a voltage of the gate terminals of the first reference transistor 345*a* and the second reference transistor 345*b* and also of the gate terminals of the first mirror transistor 367*a* and the second mirror transistor 367*b* and of the gate terminals of the first current source transistor 353*a* and the second current source transistor 353*b* is pulled down. This implies that all these transistors will turn on and start the reference circuit 300.

When the reference circuit 300 is turned on, the voltage at the first node 330 will increase and when the voltage at the first node is above a threshold voltage of the second start-up transistor 384, the second start-up transistor 384 will start to conduct. This implies that a voltage at the gate terminal of the third start-up transistor 386 is pulled down and the third start-up transistor 386 may stop conducting. This implies that the start-up circuit 380 may be turned off when the reference circuit 300 has been initiated and is operating properly.

Although the reference circuit 300 shown in FIG. 4 includes self-cascode circuits, a compensation capacitor 370 and a start-up circuit 380, it should be realized that these features are not tied to each other and may be used in any combination or individually in a reference circuit. Thus, the self-cascode circuits need not necessarily be used in combination with the reference circuit comprising a compensation capacitor 370, or vice versa. Similarly, the self-cascode circuits need not necessarily be used in combination with the start-up circuit 380, or vice versa. Also, the reference circuit comprising a compensation capacitor 370 need not necessarily be used in combination with the start-up circuit 380, or vice versa.

The reference circuits 100, 300 have been simulated to analyze the insensitivity of the voltage reference circuits 100, 300 to parameter variations. Thus, the reference circuit 100 which is relatively simple is simulated to show that the simple reference circuit 100 works. Further, the reference circuit 300 is simulated for comparison to the simple reference circuit 100.

Figure 5A:
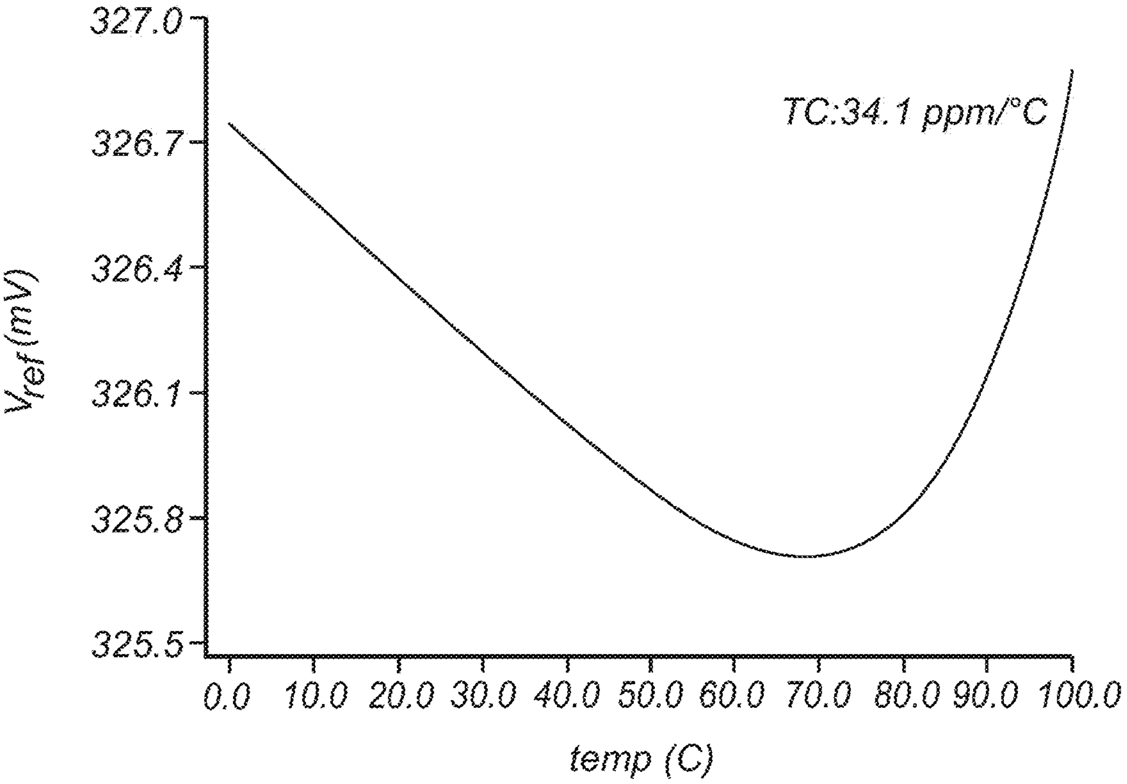
FIGS. 5*a*-5*b* are graphs illustrating temperature dependence of a voltage reference and a current reference, respectively, produced by the reference circuit according to the first embodiment.
Figure 5B:
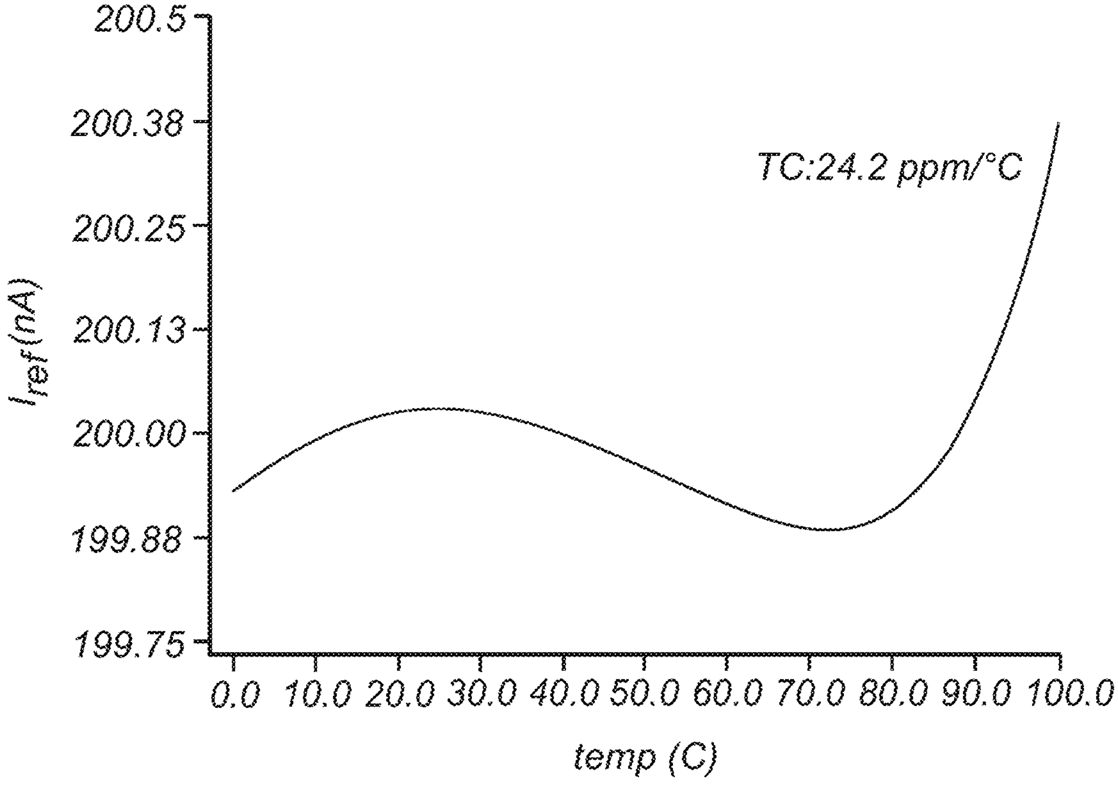

Referring now to FIGS. 5*a*-5*b*, sensitivity of the reference circuit 100 to temperature variations is illustrated. In FIG. 5*a*, the voltage reference is illustrated as a function of temperature for a supply voltage of 1.0 V. In FIG. 5*b*, the current reference is illustrated as a function of temperature for a supply voltage of 1.0 V. As may be seen, both the voltage reference and the current reference are insensitive to temperature variations. In a range from 0-100° C., the reference circuit 100 has a temperature coefficient (TC) of the voltage reference of 34.1 ppm/° C. Further, within the range, the reference circuit 100 has a TC of the current reference of 24.2 ppm/° C.

Figure 6A:
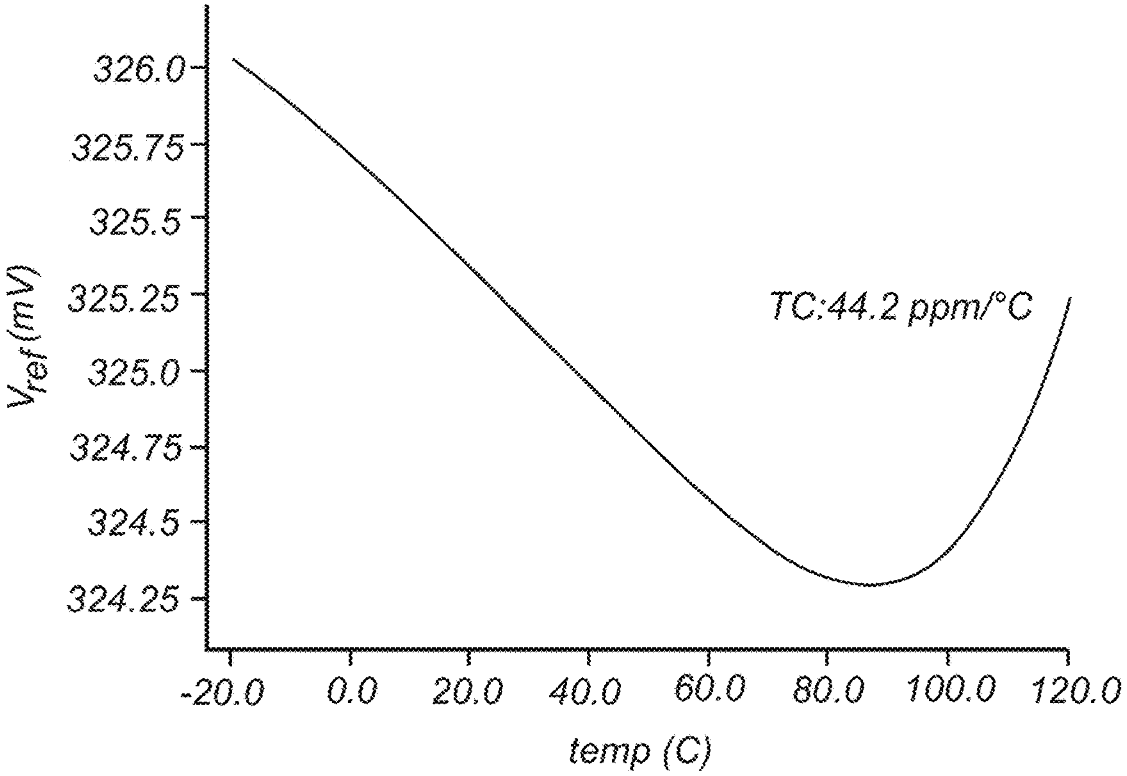
FIGS. 6*a*-6*b* are graphs illustrating temperature dependence of a voltage reference and a current reference, respectively, produced by the reference circuit according to the third embodiment.
Figure 6B:
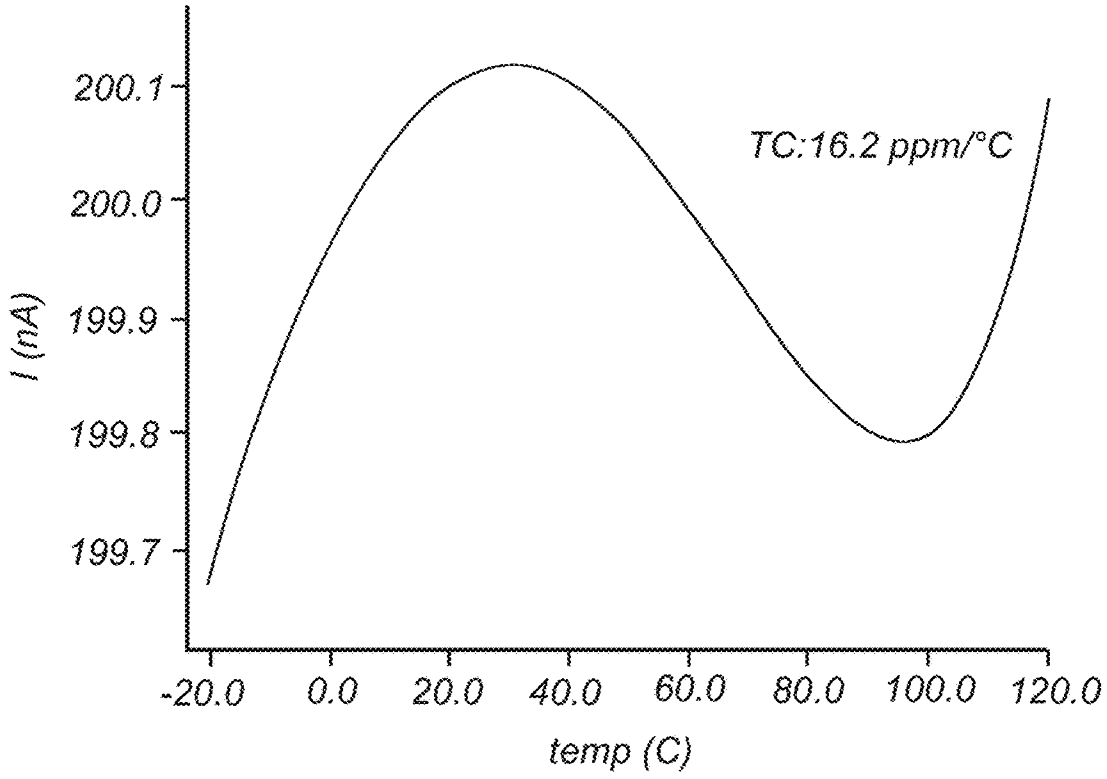

Referring now to FIGS. 6*a*-6*b*, sensitivity of the reference circuit 300 to temperature variations is illustrated. In FIG. 6*a*, the voltage reference is illustrated as a function of temperature for a supply voltage of 1.0 V. In FIG. 6*b*, the current reference is illustrated as a function of temperature for a supply voltage of 1.0 V. As may be seen, both the voltage reference and the current reference are insensitive to temperature variations. In a range from 0-100° C., the reference circuit 300 has a temperature coefficient (TC) of the voltage reference of 44.2 ppm/° C. Further, within the range, the reference circuit 300 has a TC of the current reference of 16.2 ppm/° C., which is an improvement compared to the simple reference circuit 100.

Figure 7:
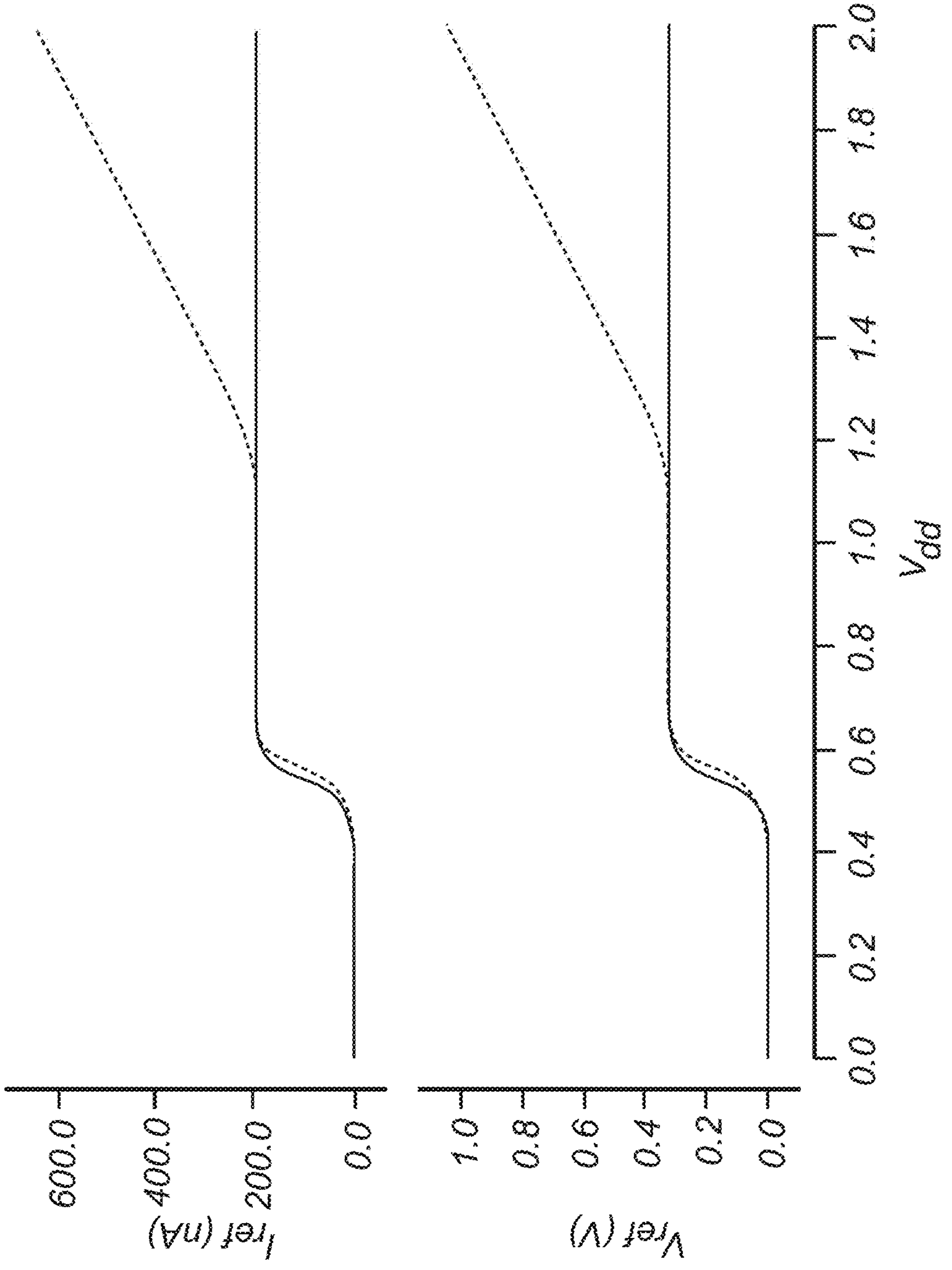
FIG. 7 is a graph illustrating dependence on supply voltage of a voltage reference and a current reference, respectively, produced by the reference circuit according to the first and third embodiments.

Referring now to FIG. 7, sensitivity of the reference circuits 100, 300 to variation in supply voltage is illustrated. In the lower graph of FIG. 7, the voltage reference is illustrated as a function of supply voltage for the reference circuit 100 (dashed line) and for the reference circuit 300 (solid line). In the upper graph of FIG. 7, the current reference is illustrated as a function of supply voltage for the reference circuit 100 (dashed line) and for the reference circuit 300 (solid line).

As can be seen in FIG. 7, the reference circuit 100 provides a stable, constant current reference and voltage reference for an operating range extending to supply voltages of 1.2 V. However, when supply voltage becomes larger than 1.2 V, the simple reference circuit 100 may no longer provide a constant current reference and voltage reference. For the reference circuit 300, the current reference and the voltage reference are maintained stable and constant over a larger range of supply voltage, extending at least to supply voltages of 2.0 V.

Figure 8:
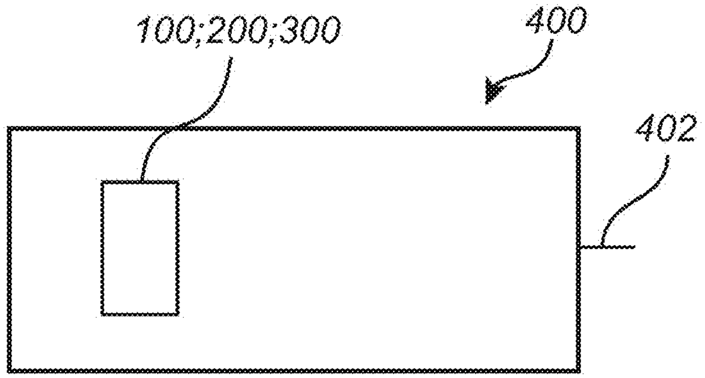
FIG. 8 is a schematic view of a power management unit according to an embodiment.

It should be realized that the reference circuits 100, 200, 300 may be used in any type of circuit or device where a stable voltage reference and current reference is desired. For instance, as shown in FIG. 8, a power management unit 400 may comprise any of the reference circuits 100, 200, 300 described above.

The power management unit 400 may be configured to control power functions of modules in electronic devices. Thus, the power management unit 400 may control whether modules are active or in sleep mode and may control power to modules.

The power management unit 400 may be configured to provide a DC voltage and/or DC current to modules of an electronic device, such as to integrated circuits. Thus, the power management unit 400 may need to ensure that a stable voltage level of the DC voltage and/or that a stable current level of the DC current is provided. In this regard, the power management unit 400 may be configured to produce the DC voltage based on the voltage reference output by the reference circuit 100, 200, 300 and/or produce a DC current based on the current reference output by the reference circuit 100, 200, 300.

The power management unit 400 may comprise an output interface 402 for communicating with modules of the electronic device. The power management unit 400 may thus send signals for controlling functionality of the modules and may also supply a DC voltage and/or a DC current to the modules over the output interface 402.

Since the power management unit 400 controls whether modules are active or in a sleep mode, the power management unit 400 may be maintained active when turning off the electronic device in which the power management unit 400 is arranged. Thus, power consumption of the power management unit 400 is important, in particular, if the power management unit 400 is arranged in a battery-powered device which may be awake only for a fraction of time, which may be the case for IoT-devices.

The reference circuit 100, 200, 300 consumes very small power. Hence, the reference circuits 100, 200, 300 are suited for being used in the power management unit 400.

Figure 9:
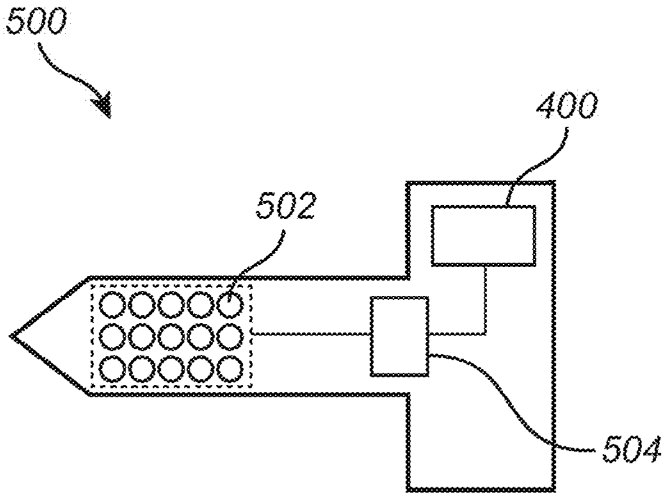
FIG. 9 is a schematic view of a neural sensing apparatus according to an embodiment.

Referring now to FIG. 9, a neural sensing apparatus 500 according to an embodiment will be described.

The neural sensing apparatus 500 may be in form of a neural probe which may be at least partly inserted into a brain. The neural sensing apparatus 500 may comprise electrodes 502 for neural sensing and readout circuitry 504 for reading out signals from the electrodes 502.

The neural sensing apparatus 500 may comprise the power management unit 400 for power management of the neural sensing apparatus 500. The power management unit 400 may be configured to control whether modules, such as the readout circuitry 504, of the neural sensing apparatus 500 are active or in a sleep mode.

The power management unit 400 may further comprise any of the reference circuits 100, 200, 300. The power consumption of the power management unit 400 of the neural sensing apparatus 500 may be very low thanks to the power management unit 400 which utilizes a reference circuit 100, 200, 300 which consumes very small power.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A reference circuit for providing a voltage reference and a current reference, said reference circuit comprising:

an operational amplifier comprising a first transistor, a second transistor and a current mirror, wherein the current mirror has unity gain and is configured to force a same drain current through the first transistor and the second transistor, wherein the first transistor and the second transistor control the voltage reference at a first node of the reference circuit; and a reference output comprising a reference resistor connected between ground and the first node and a reference transistor with drain and source terminals connected between a supply voltage and the first node, whereby the reference circuit is configured to provide the voltage reference at the first node and the current reference through the reference resistor and reference transistor.

2. The reference circuit according to claim 1, wherein the first transistor and the second transistor are p-type metal-oxide-semiconductor, PMOS, transistors.

3. The reference circuit according to claim 1, wherein a threshold voltage of the first transistor is lower than a threshold voltage of the second transistor.

4. The reference circuit according to claim 1, wherein a source terminal of the first transistor and a source terminal of the second transistor are connected to a common node and wherein a drain terminal of the first transistor is connected to a first branch of the current mirror and a drain terminal of the second transistor is connected to a second branch of the current mirror, wherein a gate terminal of the first transistor is connected to the first node for providing the voltage reference.

5. The reference circuit according to claim 4, wherein the operational amplifier further comprises a current source providing a tail current of the operational amplifier, wherein the current source is connected to the common node.

6. The reference circuit according to claim 5, wherein the current source comprises a current source transistor, wherein a gate terminal of the current source transistor is connected to a gate terminal of the reference transistor for copying the current reference and providing the current reference as basis for the tail current.

7. The reference circuit according to claim 1, further comprising an additional current branch comprising a current buffer transistor, wherein drain and source terminals of the current buffer transistor are connected between an output of the operational amplifier and a gate terminal of the reference transistor.

8. The reference circuit according to claim 7, further comprising a compensation capacitor between the output of the operational amplifier and the first node.

9. The reference circuit according to claim 7, further comprising a bias transistor having a gate terminal connected to the current mirror for copying a current of the current mirror, wherein the bias transistor is further connected to the current buffer transistor for providing a bias current for the current buffer transistor.

10. The reference circuit according to claim 1, wherein the operational amplifier is configured to output a voltage signal to a gate terminal of the reference transistor.

11. The reference circuit according to claim 1, wherein the reference resistor comprises a first reference resistor and a second reference resistor connected in series, wherein the first reference resistor has a resistance proportional to absolute temperature, PTAT, and the second reference resistor has a resistance complementary to absolute temperature, CTAT.

12. The reference circuit according to claim 1, further comprising a start-up circuit connected to the reference output for maintaining a non-zero current reference.

13. The reference circuit according to claim 1, wherein the operational amplifier is a single-stage operational amplifier.

14. A power management unit comprising the reference circuit according to claim 1, the power management unit being configured to produce a direct current, DC, voltage based on the reference voltage and/or a DC current based on the current reference.

15. A neural sensing apparatus comprising the power management unit according to claim 14.

* * * * *